United States Patent
Guard

Patent Number: 5,189,429
Date of Patent: Feb. 23, 1993

[54] METHOD AND APPARATUS FOR AMBIGUITY RESOLUTION IN ROTATING INTERFEROMETER

[75] Inventor: Glenn B. Guard, Laurel, Md.

[73] Assignee: Westinghouse Electric Corp., Pittsburgh, Pa.

[21] Appl. No.: 819,610

[22] Filed: Jan. 9, 1992

Related U.S. Application Data

[63] Continuation of Ser. No. 597,476, Oct. 12, 1990, abandoned.

[51] Int. Cl.$^5$ .............................. G01S 5/02; G01S 5/04
[52] U.S. Cl. .................................... 342/424; 342/442
[58] Field of Search ............... 342/430, 428, 425, 424, 342/423, 422, 442

[56] References Cited

U.S. PATENT DOCUMENTS

| | | | |
|---|---|---|---|
| 3,490,018 | 1/1970 | Botwin et al. | 342/94 |
| 3,886,555 | 5/1975 | Royal | 342/425 |
| 3,942,177 | 3/1976 | Danzer et al. | 342/442 |
| 4,170,774 | 10/1979 | Schaefer | 342/442 |
| 4,509,052 | 4/1985 | Casu | 342/424 |
| 4,845,502 | 7/1989 | Carr et al. | 342/430 |

*Primary Examiner*—Gregory C. Issing
*Attorney, Agent, or Firm*—W. G. Sutcliff

[57] ABSTRACT

A precision azimuth angle and ± elevation angle of an emitter are determined by measuring the frequency and differential phase $\psi_j$ of a received signal at each of a number of interferometer rotational positions. Each measured differential phase corresponds to a set of possible cone angles satisfying $$\phi_{j,k} = \cos^{-1}(\lambda \psi_{j,k}/2\pi S)$$

where $\psi_{j,k} = \psi_j + 2\pi k$ and $|\psi_{j,k}| \leq 2\pi S/\lambda$

The angular distances or errors between arbitrary azimuth angles or points and each set of cone lines is determined. The point having the smallest error corresponds to the azimuth angle and ± elevation angle of the emitter.

2 Claims, 5 Drawing Sheets

METHOD AND APPARATUS FOR AMBIGUITY RESOLUTION IN ROTATING INTERFEROMETER

This application is a continuation of application Ser. No. 07/597,476 filed Oct. 12, 1990 now abandoned.

BACKGROUND OF THE INVENTION

The present invention relates to electromagnetic direction finding; and more particularly to determining the azimuth and ± elevation angle of an emitter using two rotating antennas. Generally, in interferometer direction finding systems with broad frequency coverage, multiple antennas are used to measure ambiguous differential phases. These ambiguous differential phases are used to determine angular directions to emitters. Referring to FIG. 1, antennas 10 and 15 are spaced apart by distance S. The phase difference between signals received by the antennas 10 and 15 is measured by a phase measurement circuit 20. In general, the measured phase $\psi_j$ is related to the cone angle $\phi$ by the following expression:

$$\psi_j = (2\psi S/\pi) \cos\phi \, \text{modulo} \, 2\psi \qquad (1)$$

If the cone angle $\phi$ varies from 0 to $\pi$ and the distance S is selected to be $\lambda/2$, then the measured phase varies in accordance with $\psi_j = \pi\cos\phi$ and has values varying from $-\pi$ to $+\pi$. Under these conditions, the measured phase is unambiguous over the field of view. However, for higher frequencies or larger distances S, the measured phase varies by more than $2\pi$ and thus becomes ambiguous. For example, in the above, if $S = \lambda$, the measured phase varies in accordance with $\psi_j = 2\pi\cos\phi$. The phase therefore varies from $-2\pi$ to $+2\pi$. Thus, as shown in FIG. 1, the measured phase $\psi_j$ does not unambiguously correspond to the cone angle $\phi$. The multiples of $2\pi$ must be determined in order to resolve the cone angle. The ambiguity problem is particularly acute at higher frequencies such as 18 GHz. A common spiral antenna usable over the typical range of 2–18 GHz is about 2 inches in diameter, and the wavelength at 18 GHz is about 0.656 inches. Thus, it is physically impossible to position antennas $\lambda/2$ apart. The minimum distance between two antennas is about two inches or more than three wavelengths. Consequently, a measured phase difference does not unambiguously correspond to a cone angle.

SUMMARY OF THE INVENTION

It is an object of the present invention to provide a simple apparatus that solves the above phase ambiguity problems.

It is another object of the present invention to provide a rotating 2-element interferometer capable of accurately determining the azimuth angle of an emitter.

It is a further object of the present invention to provide a rotating 2-element interferometer capable of accurately resolving ambiguities in measured phases.

It is still another object of the present invention to provide a rotating 2-element interferometer capable of determining an elevation angle of an emitter.

It is still a further object of the present invention to provide a method of accurately resolving ambiguities in measured phases.

It is still a further object of the present invention to provide a method that accurately determines the azimuth angle of an emitter using phase measurements obtained from a rotating 2-element interferometer.

It is still another object of the present invention to provide a method of accurately resolving measured phase ambiguities using signals received from a rotating interferometer.

To achieve the above and other objects, the present invention provides a method comprising the steps of (a) receiving signals at multiple rotational positions of the interferometer; (b) measuring frequency and phase differences between signals received at respective rotational positions of the interferometer, for each of the multiple rotation positions; (c) determining a set of cone angles based on the measured phase difference for each of the multiple of rotational positions; (d) calculating a set of azimuth angles based on the set of cone angles and selected elevation angles; (e) selecting an azimuth angle that is closest to the group of the azimuth angles in the set of azimuth angles; and (f) determining an elevation angle corresponding to the selected azimuth angle.

DESCRIPTION OF THE PREFERRED EMBODIMENT

Figure 1:
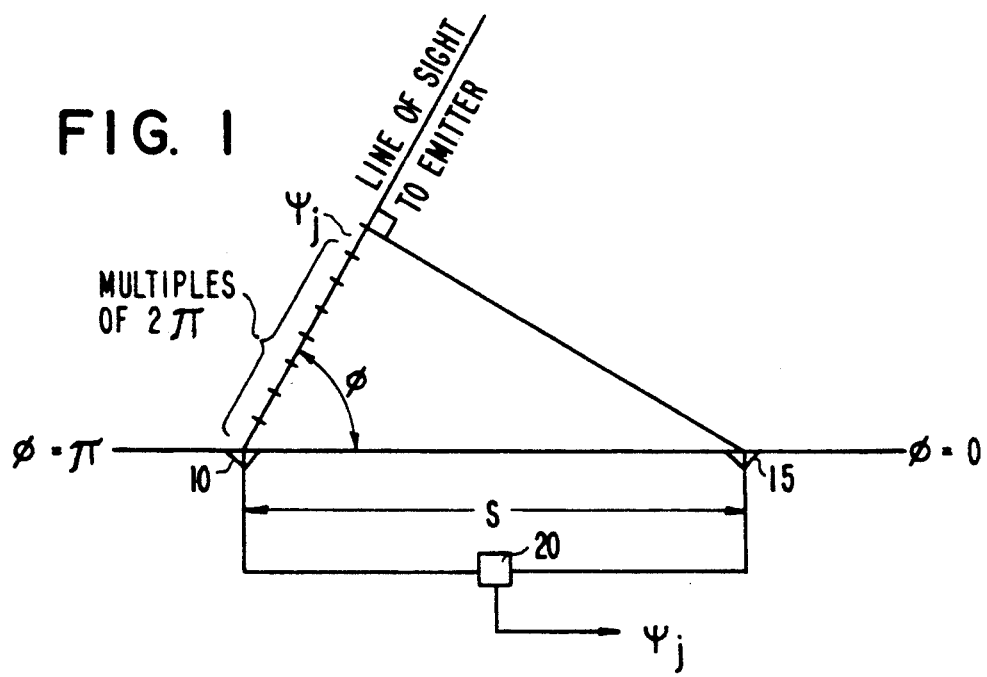
FIG. 1 schematically illustrates the geometric relationships in a 2-element interferometer.
Figure 2:
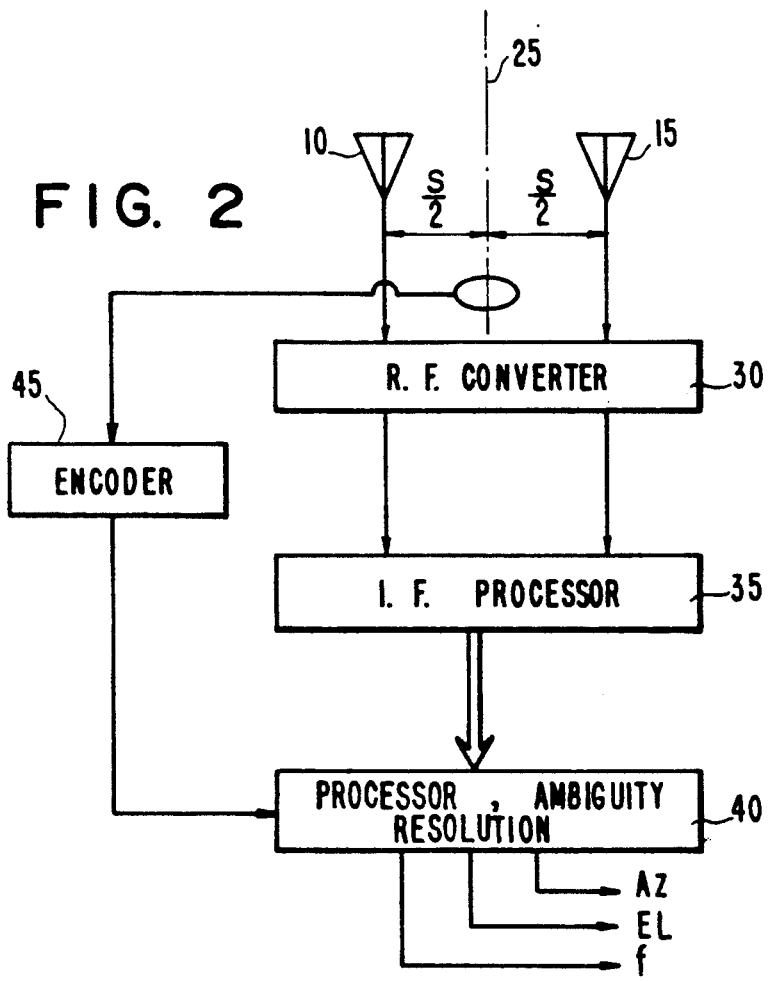
FIG. 2 is a schematic block diagram of a rotating interferometer that embodies the present invention.

In FIG. 2, an RF converter 30 receives signals from antennas 10 and 15. The frequency of the signals can be in but is not limited to, the range of 2 GHz–18 GHz. The RF converter 30 converts the signals to an intermediate frequency, and applies the signals to an intermediate frequency processor 35. The intermediate frequency processor 35 determines the frequency of the received signals and measures the phase difference $\psi_j$ between the received signals. The measured phase difference $\psi_j$ is a modulo $2\pi$ phase difference between the signals received at the antennas 10 and 15.

A processor 40 resolves the phase ambiguity inherent in the measured modulo $2\pi$ phase differences and provides signals corresponding to the azimuth and elevation of an emitter, as well as a signal indicating the frequency of the signal received by the antennas 10 and 15. An encoder 45 provides the processor 40 with a signal indicating the heading or position of the antennas 10 and 15 when signals are received by the RF converter 30. As will be recognized by those skilled in the art, the RF converter 30, IF processor 35 and encoder 45 can comprise any conventional RF converter, IF processor and encoder.

In accordance with the present invention, the IF processor 35 performs phase measurements of signals received at antennas 10 and 15 at multiple rotational positions of these antennas. In a preferred embodiment of the present invention, seven measurements are obtained at 10° intervals. The present invention, however, is not limited to obtaining measurements at fixed or specific degree intervals, and could be based upon intervals of time. It is not necessary that the time interval or angular interval should be constant. The processor 40 uses the measured (i.e., ambiguous) differential phase $\psi_j$ to determine the possible values of differential unambiguous phases that could have yielded the measured ambiguous differential phase. For each measured phase, $\psi_j$, the processor 40 develops a set of possible differential unambiguous phases that could have yielded the measured ambiguous differential phase $\psi_j$ in accordance with the following:

$$\psi_{j,k} = \psi_j + 2\pi k \qquad (2)$$

for $k = \ldots, -3, -2, -1, 0, 1, 2, 3, \ldots$, such that $|\psi_{j,k}| \leq 2\pi s/\lambda$ For each rotational position that the IF processor 35 measures an ambiguous differential phase $\psi_j$, the processor 40 develops a set of possible differential unambiguous phases that could have resulted in the measured phase in accordance with the above equation. Thus, as the interferometer rotates; that is, as the antennas 10 and 15 rotate, multiple sets of $\psi_{j,k}$ are developed. Each of the $\psi_{j,k}$ is related to a cone angle $\phi_{j,k}$ in accordance with the following:

$$\phi_{j,k} = \cos^{-1}(\lambda\psi_{j,k}/2\pi S) \qquad (3)$$

The direction from which signals are received by the antennas 10 and 15 is specified by an azimuth angle and an elevation angle. The set of cone angles $\phi_{j,k}$ are related to possible azimuth angles of arrival and elevation angles of arrival by the following:

$$A_{j,k} = H_j + \sin^{-1}(\cos(\phi_{j,k})/\cos(EL)), \qquad (4)$$

for $|\psi_{j,k}| \leq 2\pi s/\lambda$

In the above equation, $H_j$ corresponds to the heading or direction of the boresight of the antennas at the time that a differential phase measurement is made. The heading $H_j$ is provided by the encoder 45 shown in FIG. 2; and EL is a fixed elevation angle.

Figure 3:
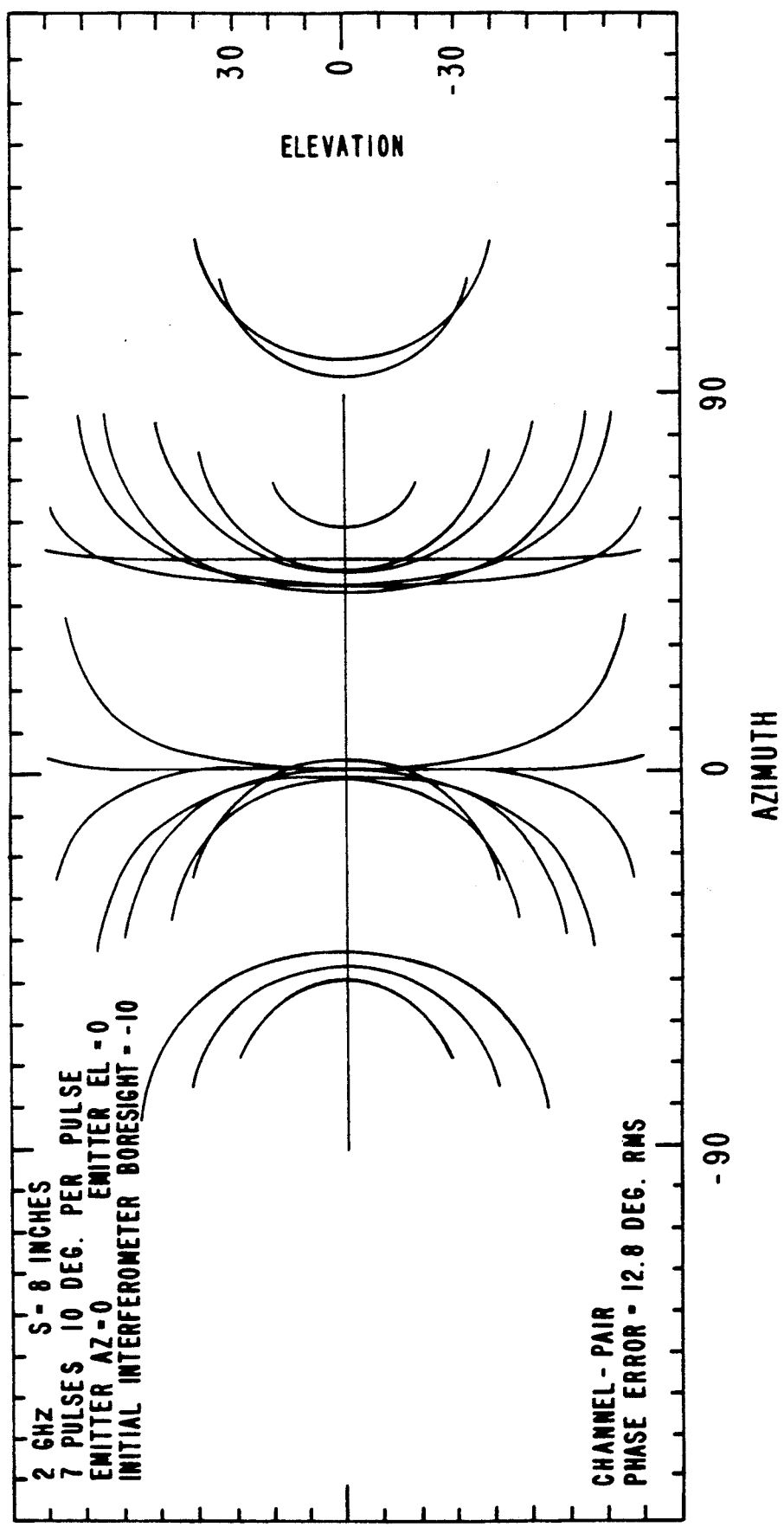
FIG. 3 is a graph illustrating possible azimuth and elevation angles of a received signal.

FIG. 3 graphically illustrates the possible azimuth angles and elevation angles that satisfy equation 4. FIG. 3 illustrates a case where seven measurements are obtained at 10° intervals of interferometer rotation. As shown in FIG. 3, each pulse or measurement results in a set of curves or cone lines. The frequency of the received signal is 2 GHz and the distance S is 8 inches", with the initial interferometer heading $H_1$ being $-10°$. With no channel-pair phase error in any of the measurements, the azimuth angle and $\pm$ elevation angle will be identified by an intersection of the curves or cone angles as shown in FIG. 4 at points A and B.

In accordance with the present invention, a signal's angle of arrival is selected as follows. Each ambiguous differential phase measurement yields several conic lines which are graphed in the examples shown in FIGS. 3, 4, and 5. An arbitrary azimuth angle is selected, and the total angular distance or error between the selected azimuth angle and a set of curves or cone lines, such as shown in FIGS. 3 and 4, is determined. For example, in FIG. 4, the two points would have zero distance to the curves. The intersection points therefore specify the azimuth angle and $\pm$elevation angle. FIG. 5 is a graph illustrating possible azimuth and $\pm$ elevation angles of arrival for a signal having a frequency higher than the signal corresponding to the curves shown in FIG. 3.

Figure 4:
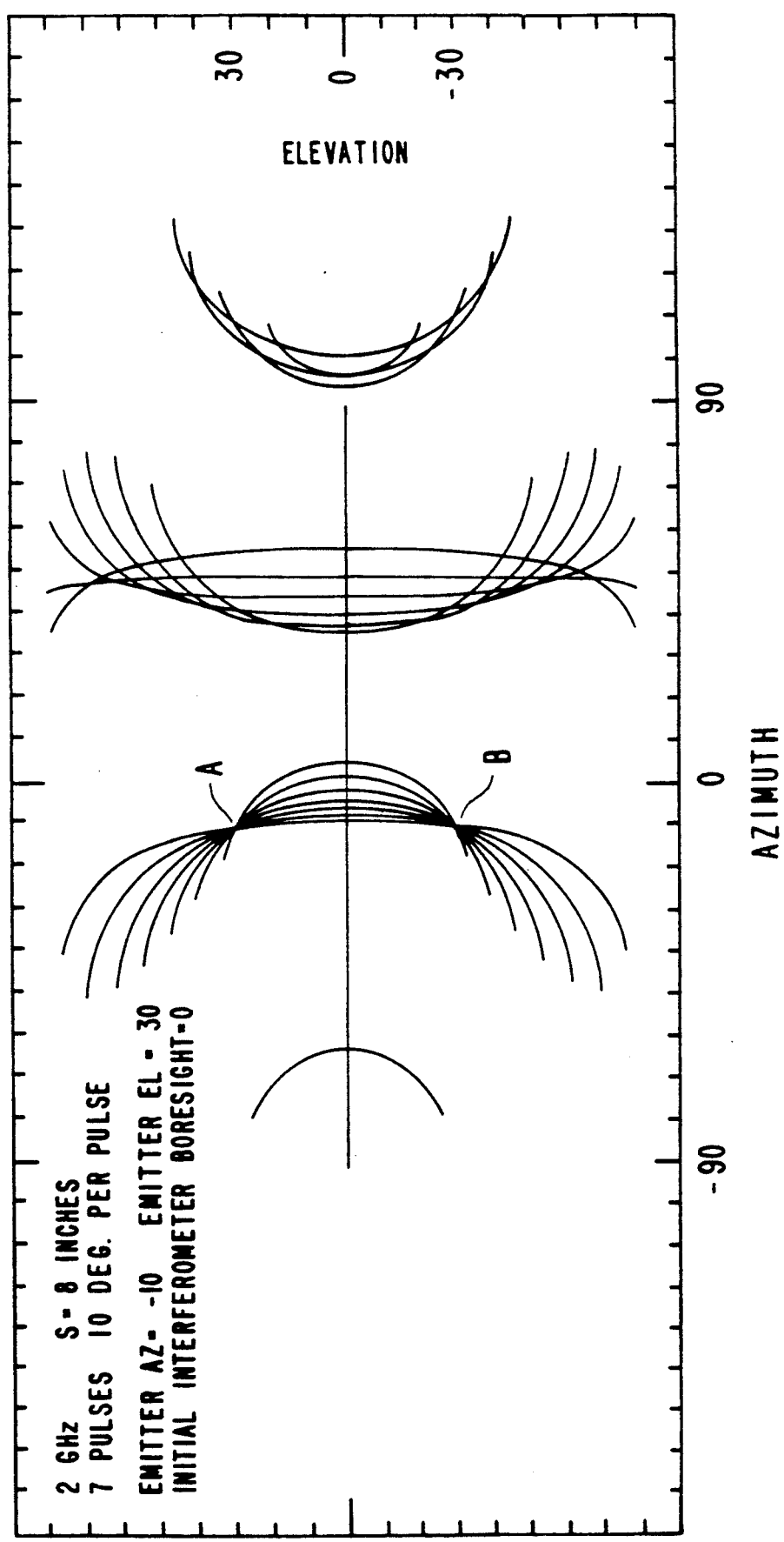
FIG. 4 illustrates identification of azimuth and elevation angles with no noise in the received signal.
Figure 5:
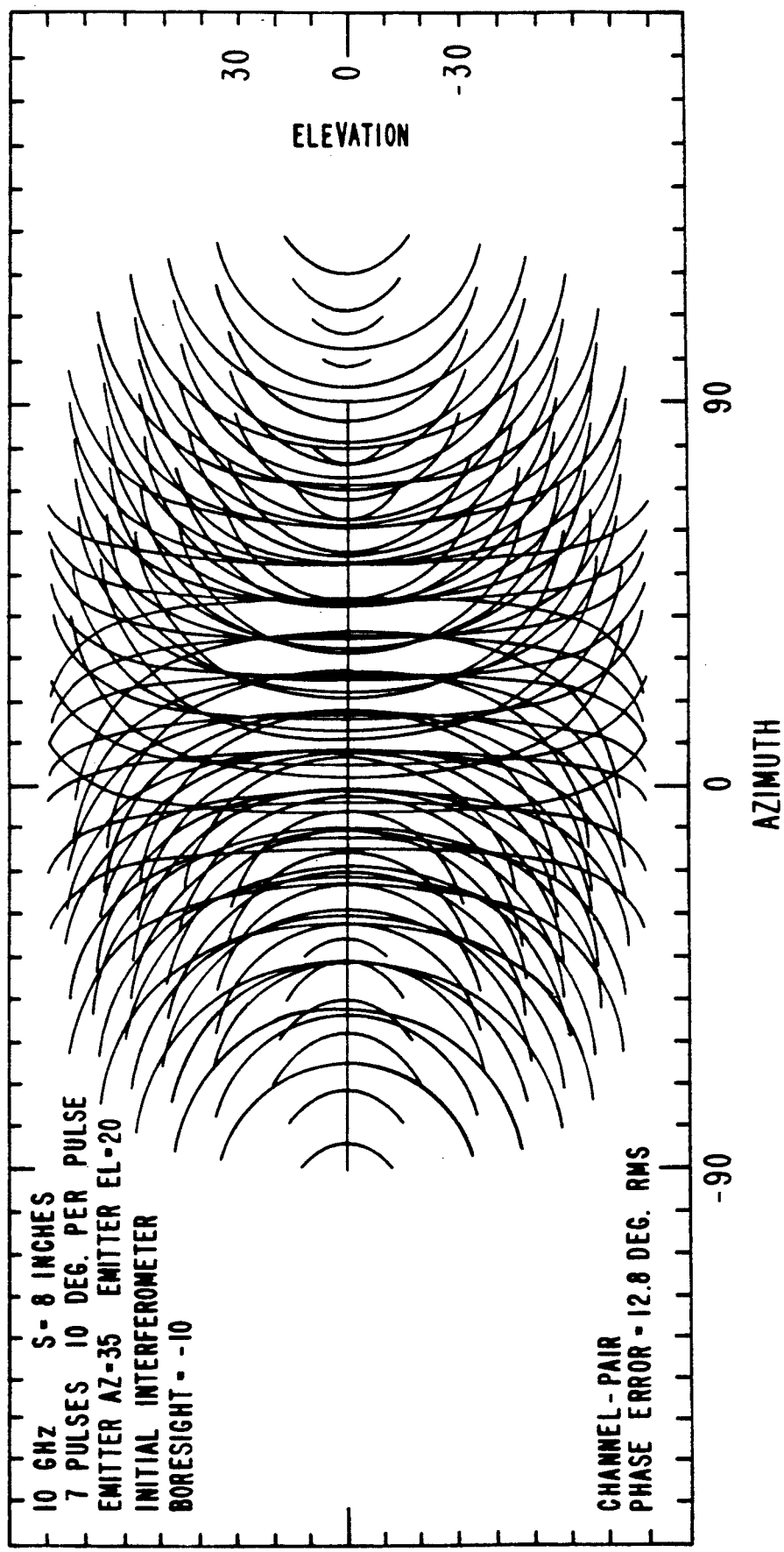
FIG. 5 is a graph illustrating possible azimuth and elevation angles of a signal having a frequency higher than the signal utilized in FIG. 3.

However, due to channel-pair phase error in actual measurements, the curves in FIG. 3 do not intersect at single points as in FIG. 4. The processor, therefore, must select a point having a minimal distance to the set of curves for each of the phase measurements. In a preferred embodiment of the present invention, the processor 40 searches the azimuth/elevation space illustrated in FIG. 3 by selecting various elevation angles and selecting a point along the selected elevation angle that has the minimal distance to the set of curves. It is not necessary to determine the azimuth and $\pm$ elevation angles in this manner. Instead, the entire azimuth/elevation angle space can be partitioned into a large number of small regions which are dimensioned $\Delta AZ$ by $\Delta EL$. Within each of these partitions, the number of AZ/EL points from phase ambiguity lines can be counted. Through suitably adjusting the $\Delta AZ/\Delta EL$ partition size and the phase ambiguity line resolution, it is possible to determine azimuth and $\pm$ elevation angle using histogramming techniques.

The present invention is not limited to any particular error or distance determination, and any such determination can be employed with the present invention. The following describes one example of determining the points having a minimal distance to the set of curves for each pulse.

For a given elevation angle an arbitrary azimuth is selected and the distances between the arbitrary azimuth angle and points $A_{j,k}$ for each pulse are determined. For each azimuth angle, one of the groups of the determined distances having the smallest error or total distance is selected. After each arbitrary azimuth has been selected and the group of distances having the smallest error has been selected for each azimuth angle, the errors or distances for each of the groups are compared. The point corresponding to the group of distances having the smallest error corresponds to the azimuth angle and $\pm$ elevation angle of arrival. Table 1 summarizes the ambiguity resolution processing logic. Table 1 does not correspond to any specific computer language, and instead, represents pseudocode. As seen from Table 1, below, for an arbitrary constant value of elevation angle, EL, a distance or azimuthal separation between the arbitrary azimuth angle, AZ, and a value $A_{j,k}$ is determined. For each of the curves generated by each measurement or pulse, the smallest total angular distance from the arbitrary azimuth angle to each of the set of curves is selected.

Figure 6:
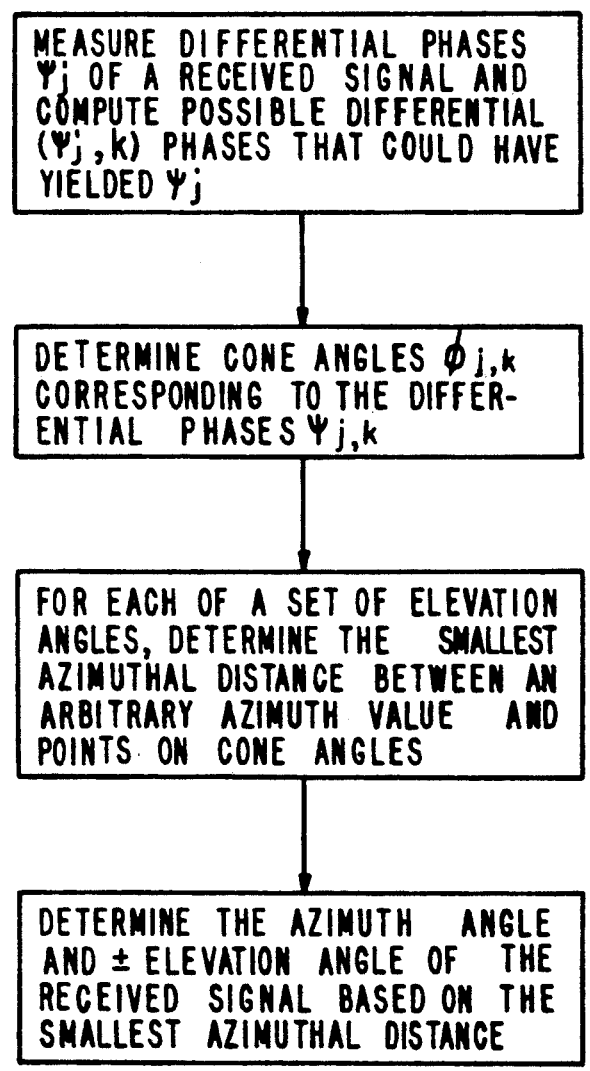
FIG. 6 is a flow diagram of ambiguity resolution in accordance with the present invention.

FIG. 6 is a logic flow diagram of the ambiguity resolution in accordance with the present invention. The logic flow illustrated in FIG. 6 is a graphical representation of the ambiguity resolution shown in Table 1 above.

The above description of the present invention is not intended to limit the present invention to the embodiments described, instead the scope of the present invention is defined by the following claims.

```
For j = 1, 2, 3, ..., N
    measure ψⱼ
    For k = ..., -3, -2, -1, 0, 1, 2, 3, ...
        ψⱼ,ₖ = ψⱼ+2πk such that |ψⱼ,ₖ| ≦ 2πS/λ
        φⱼ,ₖ = cos⁻¹ (λψⱼ,ₖ/2πS)
    next k
next j
n=0
```

```
                        -continued
For EL = to EL_max in small increments of EL,
    where |EL_max| < π/2
    n = n+1
    For j = 1, 2, 3, ..., N
        For k = ..., -3, -2, -1, 0, 1, 2, 3, ...
            such that |ψ_{j,k}| ≤ 2πS/λ
            A_{j,k} = H_j + sin^{-1} (cos (φ_{j,k})/cos(EL))
        next k
    next j
    m = 0
    For AZ = AZ_1 to AZ_2 in small increments
        of Az,
    where |AZ_1| ≤ π and |AZ_2| ≤ π.
        m = m+1
        G_m = 0
        For j = 1, 2, 3, ..., N
            For k = ..., -3, -2, -1, 0,
                1, 2, 3, ...
                such that |ψ_{j,k}| ≤ 2πS/λ
                x_k = (AZ-A_{j,k})^2
            next k
            D_j = smallest x_k
            G_m = G_m + D_j
        next j
    next AZ
    B_n = smallest G_m
next EL
E = smallest B_n
The selected (Az, ± EL) are the (AZ, ± EL)
which yield E.
```

I claim:

1. A method of ambiguity resolution in a rotating interferometer having a boresight, said method comprising the steps of:

(a) receiving signals at multiple headings of the interfermter boresight;

(b) measuring frequency and phase differences of a signal received at the multiple headings of the interferometer boresight;

(c) calculating a set of phase differences for each of the multiple headings;

(d) determining a set of cone angles based on the set of measured phase differences for each of the multiple headings;

(e) calculating a set of azimuth angles based on the set of cone angles and a range of elevation angles;

(f) determining an azimuth angle that has a minimum angular distance to the group of the azimuth angles in the set of azimuth angles; and (g) determining an elevation angle corresponding to the determined azimuth angle, where the rotating interferometer includes two elements spaced apart by a distance S, and where the set of phase differences is calculated based on $\psi_{j,k}\psi_j + 2\pi k$ such that $|\psi_{j,k}| \leq 2\pi S/\lambda$ and where $\psi_j$ represents a measured modulo $2\pi$ phase difference for k = ..., -3, -2, -1, 0, 1, 2, 3, ..., and j = 1, 2, 3, ... and said set of cone angles is calculated based on $\phi_{j,k} = \cos^{-1}(\lambda \psi_{j,k}/2\pi S)$.

2. A method of ambiguity resolution according to claim 1, wherein step (e) comprises the substep of:

(1) calculating the set of azimuth angles based on $A_{j,k} = H_j + \sin^{-1}(\cos(\phi_{j,k})/\cos(EL))$ where $H_j$ is a heading of the interferometer boresight and EL is a selected elevation angle.

* * * * *